United States Patent [19]

Hayashi

[11] Patent Number: 4,826,362

[45] Date of Patent: May 2, 1989

[54] SOLID TRANSFER APPARATUS

[75] Inventor: Takeshi Hayashi, Naruto, Japan

[73] Assignee: Kyoeizoki Co., Ltd., Tokushima, Japan

[21] Appl. No.: 562,051

[22] Filed: Dec. 16, 1983

Related U.S. Application Data

[63] Continuation of Ser. No. 495,397, May 11, 1983, abandoned, which is a continuation of Ser. No. 230,366, Jan. 30, 1981, abandoned.

[30] Foreign Application Priority Data

Feb. 1, 1980 [JP]  Japan .................................. 55-11674

[51] Int. Cl.[4] ............................................. B65G 53/30
[52] U.S. Cl. .................................... 406/109; 406/120; 406/151; 406/156; 43/6.5
[58] Field of Search ................. 406/48, 109, 120, 156, 406/151-153, 168, 171; 43/6.5; 119/3, 82

[56]  References Cited

U.S. PATENT DOCUMENTS

| | | | |
|---|---|---|---|
| 3,378,310 | 4/1968 | Christensen | 406/109 X |
| 3,871,332 | 3/1975 | Hayashi | 119/3 |
| 4,154,484 | 5/1979 | Holzenberger | 406/109 X |
| 4,293,250 | 10/1981 | Hayashi | 406/109 |

FOREIGN PATENT DOCUMENTS

| | | | |
|---|---|---|---|
| 2906315 | 8/1980 | Fed. Rep. of Germany | 406/109 |
| 99130 | 8/1981 | Japan | 406/109 |
| 140413 | 6/1986 | Japan | 406/151 |
| 1107126 | 3/1968 | United Kingdom. | |
| 1232928 | 5/1971 | United Kingdom. | |
| 1385994 | 3/1973 | United Kingdom. | |
| 1455282 | 11/1976 | United Kingdom. | |
| 2011547 | 7/1979 | United Kingdom. | |

Primary Examiner—Joseph F. Peters, Jr.
Assistant Examiner—James M. Kannofsky
Attorney, Agent, or Firm—Wenderoth, Lind & Ponack

[57]   ABSTRACT

A solids transfer apparatus has at least one closed tank provided with a suction opening and a discharge opening, a suction valve communicated with the suction opening, a discharge valve communicated with the discharge opening, a pressure reducer for introducing solids into the closed tank and a supply device for discharging solids in fluid out of the closed tank whereby solids can be transferred. A removing device constituted by a water supply and a solids removing valve may be provided so that solids in the suction valve are removed before the suction valve is closed.

27 Claims, 8 Drawing Sheets

SOLID TRANSFER APPARATUS

This application is a continuation of application Ser. No. 495,397, filed May 11, 1983, now abandoned, which is a continuation of application Ser. No. 230,366, filed Jan. 30, 1981, now abandoned.

BACKGROUND OF THE INVENTION

The present invention relates to an apparatus for transferring solids such as fish, hams and sausages by the use of a liquid as the transfer medium.

Presently, two methods generally are known for transferring solids which are easily damaged by the use of water as the transfer medium. One method employs a rotary pump system in which solids and water are passed through a rotating impeller in a bladeless pump or the like. The other method employs a static volume type transfer system in which the volume in a closed tank is reduced by a vacuum pump, and solids and solids and water are sucked through a nonreturn valve and a suction pipe into the tank and then discharged therefrom through a nonreturn valve and a discharge valve by the injection of compressed air.

The former method is efficient since solids can be continuously transferred. However, as the solids are passed through a centrifugal impeller rotating at a high speed, they are apt to be damaged. Further, if the least amount of air is sucked into the pump, the operation of the pump stops and the solids may be badly damaged.

The latter method is not efficient because of the batchwise operation in which the discharge action is stopped during the suction step and the suction action is stopped during the discharge step. If a plurality of closed tanks are provided so as to obtain a reversible operation in which one tank carries out the suction action with the other is carrying out the discharge action and then the reverse actions are carried out, the abovementioned inefficiency still cannot be overcome. The reason is that the operation must be stopped during the changing-over operation, and especially, the suction action cannot be started until the pressure in the tank is reduced to some extent.

SUMMARY OF THE INVENTION

The inventor has succeeded in efficiently transferring solids by providing a solids transfer apparatus in which a porous plate is provided in a closed tank so as to divide the inside of the closed tank into a water chamber and a solids chamber, and a water pump is connected through a four-way change-over valve to the water chamber. In this apparatus, water is discharged out of the closed tank by means of the water pump and solids and water are introduced into the closed tank so as to raise the concentration of the solids in the closed tank. When the required amount of solids has been introduced into the closed tank, the four-way change-over valve is changed-over and water is introduced under pressure into the closed tank, whereby the solids are discharged.

In an apparatus of such a construction, solids are not passed through an impeller and they can be transferred without being much damaged. But disadvantageously, since a suction valve is required on the suction side of the closed tank, the solids are apt to be caught and damaged by the suction valve when it is closed. The suction valve is completely closed in the discharge step in order to prevent the counterflow of the liquid. As a result, almost all of the solids caught in the suction valve are cut or badly pressed, i.e. damaged sufficiently to lose their value for sale. Further, if solids are caught in the suction valve, the suction valve is loaded in an unbalanced manner is apt to be damaged.

According to the static volume type transfer method, if solids are prevented from being caught in the suction valve, they can be transferred without being damaged in the most ideal manner.

After having experimentarily made a variety of solids transfer apparatuses and tested them, the inventor has succeeded in solving the abovementioned problem by providing a solids transfer apparatus having a simple construction.

Therefore, an important object of the present invention is to provide a solids transfer apparatus in which solids can be prevented from being caught in the suction valve and thereby can be transferred without being damaged.

Another important object of the present invention is to provide a solids transfer apparatus in which solids can be prevented from being caught in the suction valve by a simple construction and a simple operation.

BRIEF DESCRIPTION OF THE DRAWINGS

Now, the present invention will be described with reference to the appended drawings, in which.

DETAILED DESCRIPTION OF THE INVENTION

Figure 9:
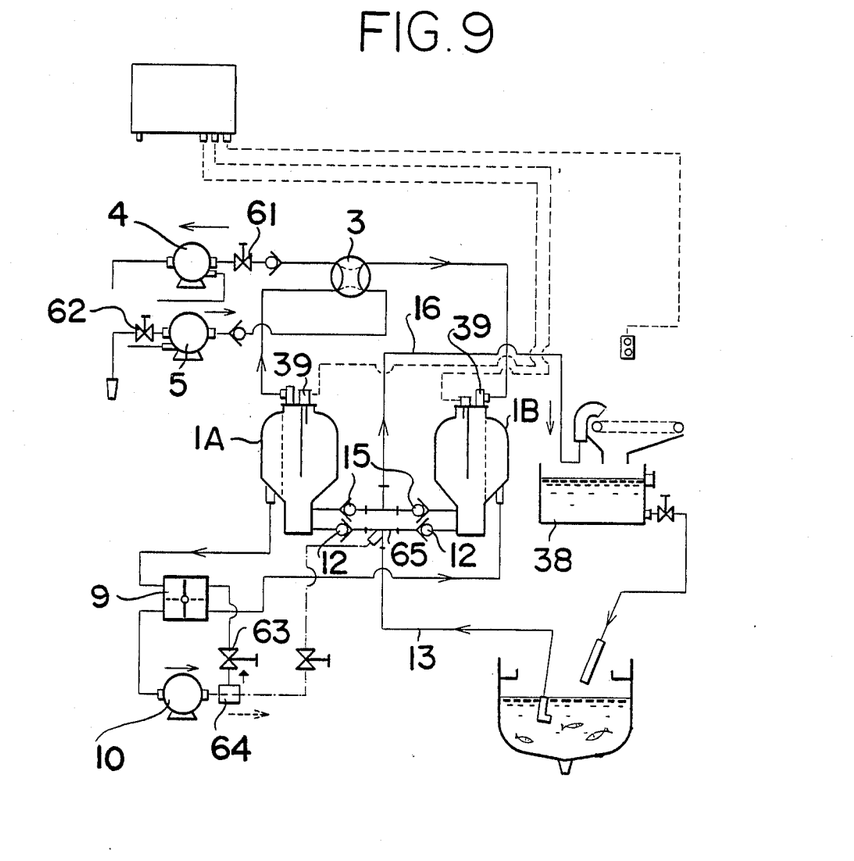
FIG. 9 is a partly enlarged sectional view of a solids transfer apparatus in which a nonreturn valve for suction use is so constructed as not to catch any solids therein when it is closed.

The principal construction and operation of a static volume type solids transfer apparatus will be described with reference to FIGS. 1, 5, 6 and 7, and the most important construction of the apparatus according to the present invention will be described with reference to FIG. 9.

A solids transfer apparatus according to the present invention comprises a closed tank adapted to be closed in an airtight manner, a pressure reduction means for discharging air or liquid from the closed tank so that solids and liquid can be sucked into the closed tank, and supply means for supplying air or liquid into the closed tank so that solids introduced into the closed tank are then discharged therefrom.

The closed tank is provided with a suction opening and a discharge opening. To the suction opening, there is connected a suction valve which is opened only when solids and liquid are sucked into the closed tank, while to the discharge opening, there is connected a discharge valve which is opened only when the solids and liquid are discharged out of the closed tank.

In the solids transfer apparatus shown in FIGS. 1, 5, 6 and 7, the pressure reduction means comprises a vacuum pump and a water pump, and the supply means comprises a compressor and a water pump. The vacuum pump functioning as the pressure reduction means is used for discharging air from the closed tank, and the water pump is used for discharging water from the closed tank, whereby liquid including solids is sucked into the closed tank. Further, air is introduced under pressure into the closed tank by means of the compressor used as the supply means, and liquid is supplied into the closed tank by means of the water pump, whereby liquid and solids in the closed tank are discharged therefrom.

Since the pressure reduction means is used for discharging either or both air and liquid out of the closed tank, it may comprise either or both a vacuum pump and a water pump. Similarly, the supply means may comprise either or both a compressor and a water pump.

Figure 1:
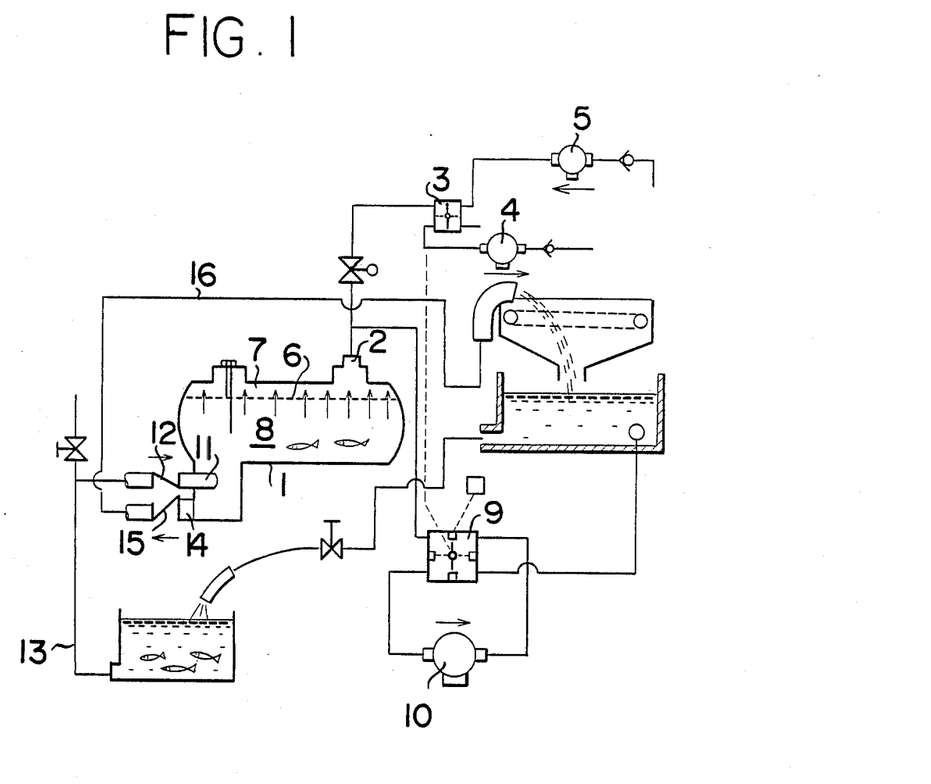
FIG. 1 is a schematic sectional view of an example of a solids transfer apparatus according to the present invention.

In FIG. 1, a water inlet and outlet opening 2 which is also used as an air outlet opening is provided in the upper part of a closed tank 1. A vacuum pump 4 and a compressor 5 are connected through an air change-over valve 3 to the water inlet and outlet opening 2 so as to provide an air control system for controlling the air suction action and the air compression action in the tank.

In the upper part of the closed tank 1, there is stretched a porous plate 6 through which water can be passed but fish cannot be passed, so that the inside of the closed tank 1 is divided into a water chamber 7 in the upper portion and a solids chamber i.e. fish chamber 8 in the lower portion. Further, a water pump 10 is connected through a four-way change-over valve 9 to the water inlet and outlet opening 2 which opens into the water chamber 7.

A suction pipe 13 is connected through a swing type nonreturn valve 12 functioning as a suction valve to a suction opening 11 provided in the lower portion of the fish chamber. On the other hand, a discharge pipe 16 is connected through a swing type nonreturn valve 15 i.e. a discharge valve to a discharge opening 14 in the lower part of the fish chamber.

The water pump 10 is preferably a centrifugal pump. Fish are sucked into the fish chamber 8 to raise the concentration of fish in the fish chamber 8 and to raise the range of lift of the suction side of the water pump 10. A centrifugal pump is suitable because it has a discharge characteristic such that the discharge volume of the pump decreases as the range of lift is raised, and more favorably the pump stops discharging liquid at a predetermined range of lift.

The most suitable pump for use in a solids transfer apparatus according to the present invention is a volute pump such as a turbine pump (diffuser pump).

A volute pump has a construction such that a liquid sucked in from the center is rotated by a rotating impeller and the liquid is transferred under pressure by centrifugal force. Therefore, the highest discharge pressure of the pump is determined by the rotation speed and the diameter of the impeller. The volute pump has a characteristic such that as the discharge pressure comes close to the highest discharge pressure, the discharge decreases greatly while the power hardly changes.

Figure 2:
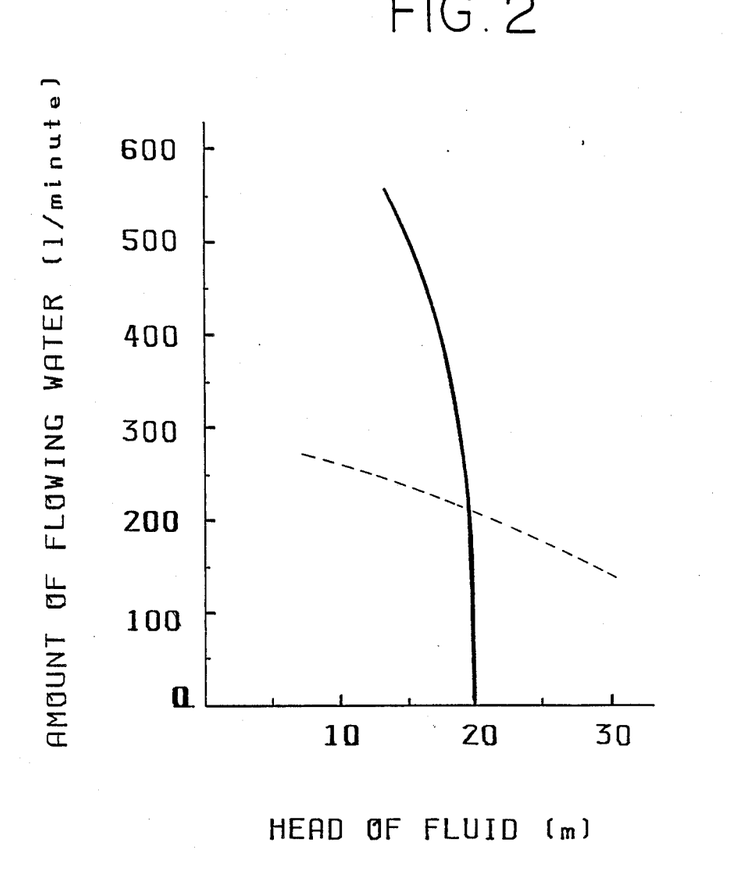
FIG. 2 is a graph showing the discharge characteristics of a turbine pump and a cascade pump.

The discharge characteristic of a turbine pump used as a water pump is illustrated in FIG. 2

As is apparent from FIG. 2, in the turbine pump, when the range of lift is 14 m, the discharge is 550 l/min. When the range of lift is 18 m, the discharge is below 400 l/min. Further, when the range of lift becomes 19 m, the discharge greatly decreases to 280 l/min. which is about half the value when the range of lift is 14 m. Furthermore, when the range of lift is 20 m, the discharge becomes 0. That is, when the range of lift rises by 6 m (about 0.6 kg/cm$^2$), the discharge decreases to half, and when the range of lift rises by 7 m (about 0.7 kg/cm$^2$), the suction action stops.

The broken line in FIG. 2 shows the discharge characteristic of a cascade pump (regenerative pump or viscous pump) which is driven by a motor of the same power (2.2 KW).

In this cascade pump, when the range of lift is 8 m the concentration of the solids is low, the discharge is 270 l/min. which value is much lower than that of the turbine pump. However, when the range of lift becomes as high as 20 m, the discharge is 210 l/min., that is only 60 l/min. lower. Further, when the range of lift becomes 30 m, the suction action does not stop and the pump discharges about 170 l/min. of liquid.

To sum up, a turbine pump has a discharge characteristic close to a constant range of lift, that is, a high discharge at a low range of lift and a low discharge at a high range of lift. On the other hand, a cascade pump has a discharge characteristic close to a constant discharge independently of the range of lift.

A turbine pump which has a discharge characteristic close to a constant range of lift as abovementioned is advantageous for use as the water pump for the following reasons. When the concentration of the solids is low and liquid can pass through the porous plate or between solids while meeting little resistance, the turbine pump sucks a large amount of liquid and rapidly fills the closed tank with the solids. And as the concentration of the solids becomes higher, the discharge becomes lower, so that the solids can be prevented from being drawn strongly onto the porous plate and crushed. The solids can be pushed toward the porous plate with a constant force independently of the concentration of the solids in the liquid. Therefore, the solids can be prevented from being sucked so strongly as to be pressed too hard.

If a volute pump is used as the water pump, the bore, the dimensions and shape of the impeller, the number of the steps, the capacity of the drive motor and the type of pump (e.g. a turbine pump or a volute pump) are determined depending on the use of the solids transfer apparatus.

Figure 3:
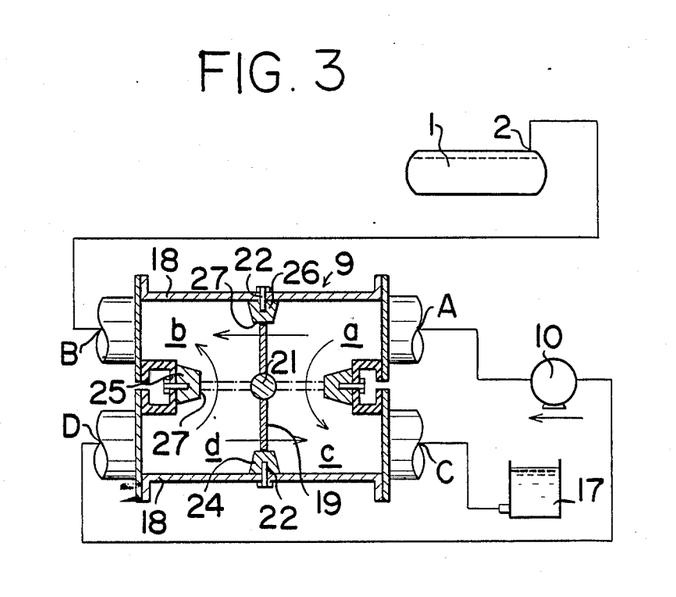
FIGS. 3 and 4 are sectional views showing a four-way change-over valve used in the solids transfer apparatus of FIG. 1.
Figure 4:
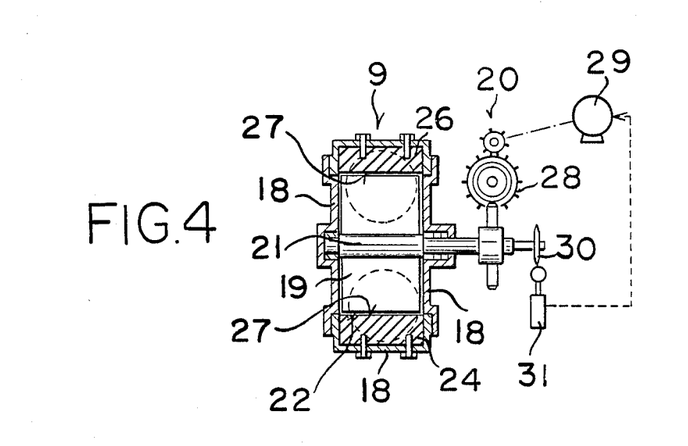

The four-way change-over valve 9 in FIG. 1 is illustrated in detail in FIGS. 3 and 4. The four-way change-over valve 9 comprises a casing 18, a closing element 19 and a change-over means 20 for rotating the closing element 19.

The casing 18 is provided with four change-over chambers a, b, c and d which are communicated with four ports A, B, C and D respectively and also with one another The change-over chambers a, b, c and d are located around the axis of rotation of the closing element 19.

The ports D and A are connected to the suction and discharge sides of the water pump 10 respectively, while the port B is connected to the water inlet and outlet opening 2 of the closed tank 1 and the port C to a water tank 17 from which the liquid is fed.

The shaft 21 of the closing element 19 is rotatably mounted on the casing 18. The closing element 19 is so constructed that, at its stop positions disposed 90 degrees apart, it can define watertight change-over chambers on either side thereof. For this purpose, at the stop positions, the closing element 19 comes close to, i.e. with a slight clearance, or into slidable contact, with four valve seats 23, 24, 25 and 26 the bases 22 of which are fixed to the casing 18, while the two side edges i.e. the right and left edges of the closing element 19 in FIG. 4 are substantially watertightly slidably engaged with the inner surface of the casing 18.

The four valve seats 23, 24, 25 and 26 are fixed inside the casing 18 at the same distance from the shaft 21 of the closing element 19 and at the boundaries between the change-over chambers communicated with the ports respectively, the distances between two opposite valve seats are equal to the length of the closing element 19. The water seal surfaces 27 of the valve seats, to which the edges 22 of the closing element 19 come close or in slidable contact in a watertight manner, are concavely curved with a radius of curvature equal to the length of the closing element 19 so as to be on the rotation locus of the edges 22 of the closing element 19.

Further, the shape of the closing element 19 is that of a plate so as to connect desired adjacent ports A, B, C and D at any change-over position quickly without blocking the ports for any significant length of time.

The shaft 21 of the closing element 19 is mounted in the casing 18 in a watertight manner To the part of the shaft protruding out of the casing 18 is connected a worm gearing 28, driven by a motor 29, the motor being controlled by a limit switch 31 actuated by cam 30 on shaft 21, which parts together constitute a change-over means 20.

The closing element 19 is stopped precisely at the predetermined stop position when the cam 30 pushes a plunger of the limit switch 31. For this purpose, the cam 30 has a rectangular shape and is fixed to the shaft 21 of the closing element 19 so that the plunger of the limit switch 31 can be pushed by the cam 30 when the closing element 19 is at the stop position, namely when the edges 22 of the closing element 19 are in contact with or come close to the water seal surface 27 of respective of the valve seats.

When the limit switch 31 is pushed by the cam 30, it interrupts the power supply to the motor 29 rotating the closing element 19, whereby the closing element is stopped at the predetermined position.

Thus, the closing element 19 can be rotated through an angle of 360 degrees so as to cause the valve to be changedover by a simple change-over means e.g. the motor 29 adapted to rotate in a predetermined direction. However, the closing element 19 may be reciprocally rotated through an angle of 90 degrees instead of being rotated continuously.

In FIG. 4, the change-over means for the closing element 19 includes the motor 29, but the closing element 19 also can be changed-over by hand operation. For such hand operation, the change-over means may include a handle (not shown) or the like connected directly or through e.g. a gear to the shaft 21 of the closing element 19.

The operation of the solids transfer apparatus having the above described construction is as follows:

1. The air change-over valve 3 is set at the position as shown in full lines in FIG. 1, valve 12 is opened, and the vacuum pump 4 is operated to reduce the pressure inside the closed tank 1, whereby water and fish are sucked into the closed tank 1 through pipe 13.

2. The four-way change-over valve 9 is set at the position as shown in full line in FIG. 1, and the water pump 10 communicated with the water chamber 7 is operated.

3. When water and fish begins to be sucked by means of the water pump 10, the operation of the vacuum pump 4 is stopped. Then, only the water pump 10 is operated, whereby the concentration of fish in the closed tank 1 is raised.

4. When the concentration of fish in the closed tank 1 becomes high, the air change-over valve 3 is changed-over and at the same time the four-way change-over valve 9 is changed-over to tee position as shown in broken lines, and valve 12 is closed and valve 15 opened, so that the closed tank 1 is put into the discharge condition. In this condition, water under pressure from pump 10 is fed into the closed tank 1. Therefore, due to the water thus fed, the concentration of fish in the closed tank 1 which has been already raised high is caused to be lowered. Thereby the fluidity in the closed tank 1 becomes high, and fish are discharged through the nonreturn valve 15 and the discharge pipe 16.

Figure 5:
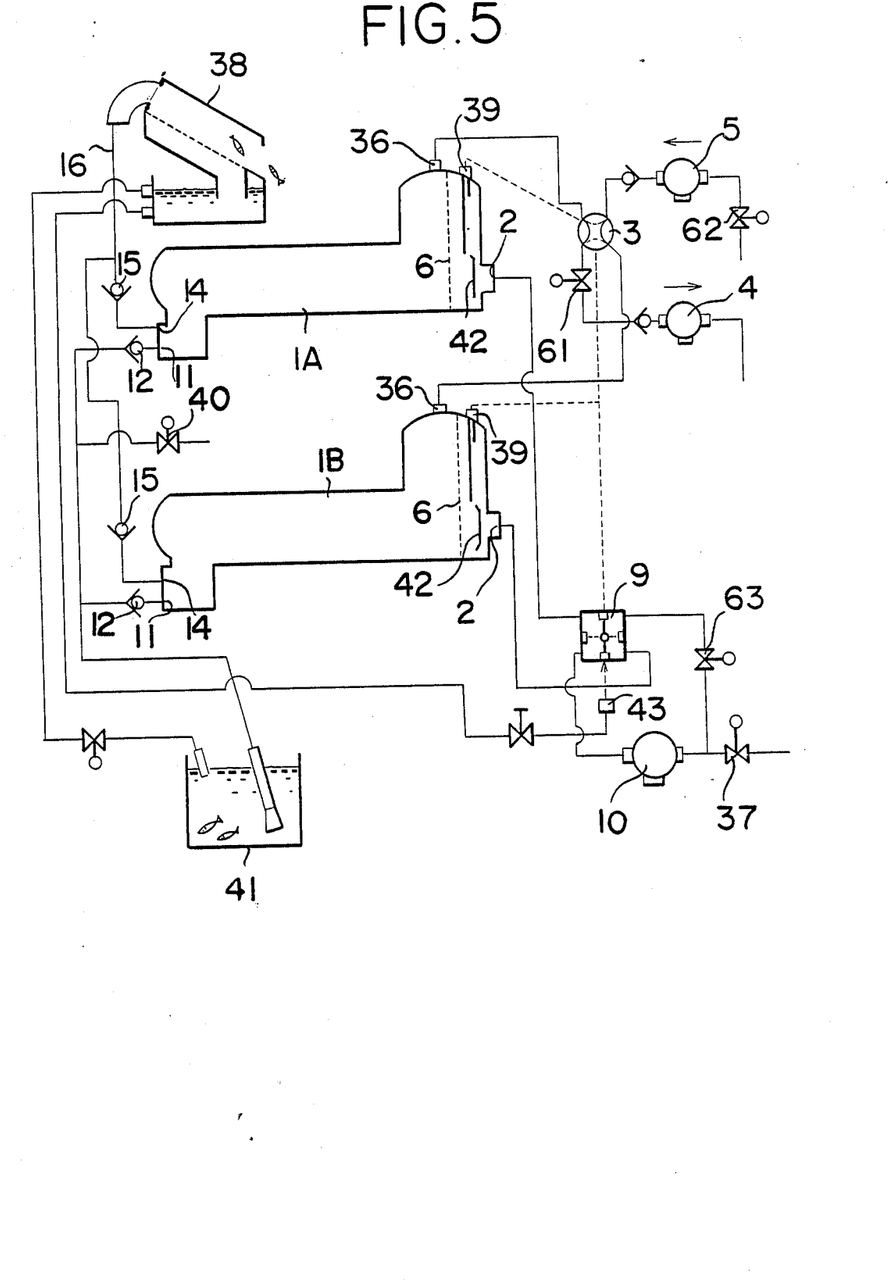
FIG. 5 is a schematic sectional view of a solids transfer apparatus provided with two closed tanks.
Figure 6:
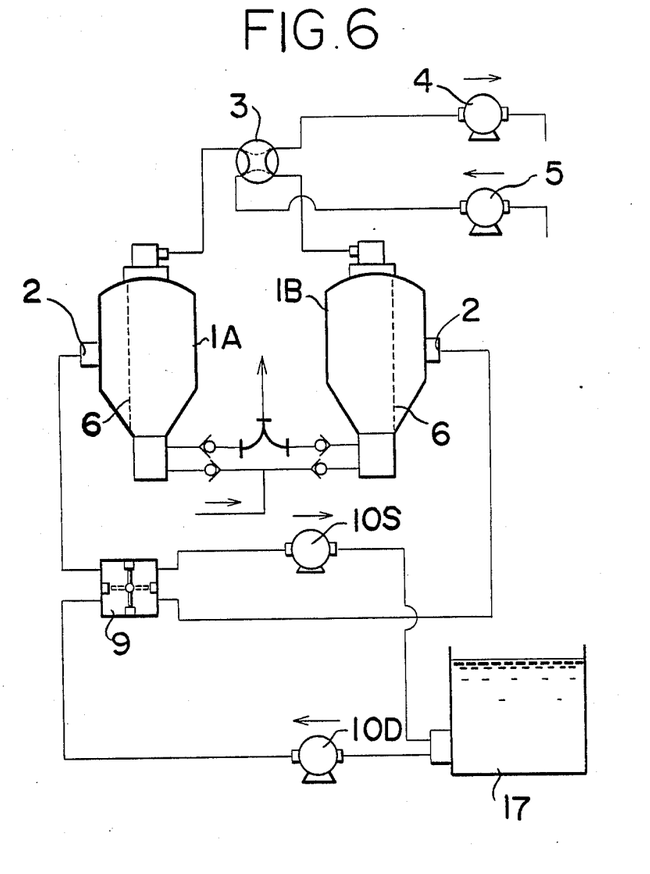
FIGS. 6 and 7 are schematic sectional views of a solids transfer apparatus provided with two closed tanks.

A solids transfer apparatus shown in FIG. 5 comprises two closed tanks 1A and 1B. The closed tanks 1A and 1B are connected through the four-way change-over valve 9 to the water pump 10. Each of the closed tanks 1A and 1B is formed in an L-shape and provided with an air inlet and outlet opening 36 on its upper end portion The vacuum pump 4 and the compressor 5 are connected through the air change-over valve 3 to the air inlet and outlet openings 36.

The operation of the solids transfer apparatus having this construction is as follows:

1. With the air change-over valve 3 and the four-way change-over valve 9 being set at the positions as shown in full lines in FIG. 5, the vacuum pump 4 is operated so that water and fish are sucked into the closed tank 1A. When the water inlet and outlet opening 2 is below the water level, the water pump 10 is operated to suck water and fish into the closed tank 1A and thus to obtain a high concentration of fish in the closed tank 1A.

2. Through the detection of the upper limit water level by means of the level detector 39, the operation of the vacuum pump 4 is stopped. Then only the water pump 10 is operated whereby the concentration of fish in the closed tank 1A is further raised.

However, if the air discharge rate of the vacuum pump 4 is low, the concentration of fish in the closed tank 1A has been already raised enough when the upper limit water level is detected. In this case, the operation of the water pump 10 is stopped simultaneously with the stopping of the operation of the vacuum pump 4.

3. When the concentration of fish in the closed tank 1A becomes high, the air change-over valve 3 and the four-way change-over valve 9 are changed-over to the positions as shown in broken lines in FIG. 5, whereby the closed tank 1A is placed in the discharge condition and the closed tank 1B in the suction condition.

4. When a certain amount of water and fish is sucked into the closed tank 1B, only water is transferred under pressure from the closed tank 1B through the porous plate 6 into the closed tank 1A by means of the water pump 10. Thus the concentration of fish in the closed tank 1B is raised through the operation of the water pump 10, and such operation of the water pump 10 at the same time causes water under pressure to be injected into the closed tank 1A. As a result the concentration of fish in the closed tank 1A, having already been raised, is now lowered due to the water injected therein, and the fluidity of water and fish in the closed talk 1A is improved. Thereby fish can be smoothly discharged from tank 1A through the nonreturn valve 15 and the discharge pipe 16 thereof.

When water and fish are sucked into the closed tanks 1A and 1B, fish are apt to settle in the closed tank since the specific gravity of fish is somewhat larger than that of water. Consequently, in the earlier stage of the discharge step, water including a high concentration of fish is discharged. Then much water is injected into the tank when the water becomes low. At this time, it is preferable that this step ends with no fish remaining in the closed tank and then a new operation starts. This is preferable in another respect, namely that fish can be prevented from being caught in the swing type nonreturn valve 15 on the discharge side.

The above described operation is repeated. In this case, the volume ratio of the air system comprising the vacuum pump 4, compressor 5, the four-way change-over valve 3 and the like to the water pump 10 has an influence upon the time required for carrying out one cycle of the operation. Namely, if the volume of the air system is smaller, one cycle of the operation takes more time, and in the reverse case it takes less time. If the concentration of fish in the water passing through the suction pipe is low, it is preferable to employ a larger capacity water pump and thus to obtain a longer time of one cycle of the operation.

The following operation may be used in order to decrease the volume of the air system.

With the change-over time of the closed tanks 1A and 1B as the starting point, the starting of the operation of the vacuum pump 4 and the compressor 5 and the change-over of the four-way change-over valve 3 are simultaneously performed. The operation of the compressor 5 is arranged to stop earlier than that of the vacuum pump 4 by a timer control system, while the four-way change-over valve is arranged to be changed-over a predetermined time after that by using another timer. With such an arrangement, the discharge step can be carried out in such a manner that, instead of the discharge of the whole amount of water and fish in one step, water and fish are discharged only until the water level reaches the level of the surface of the settled fish, and then the remaining fish can be swept out by the water flow from the water pump. Naturally, if a process reverse to the above described one is applied to the closed tank on the suction side, the amount of air in the closed tank is decreased, so that the time required for filling the closed tank with water can be shortened and therefore a longer time can be taken for the aperture of raising the concentration of fish in the closed tank through the suction action of the water pump.

The capacities of the air system and the water pump can be controlled by means of three valves 61, 62, 63. In FIG. 5, the valves 61 and 62 for controlling the capacity of the air system are connected to the suction side of the vacuum pump 4 and the suction side of the compressor 5, respectively, while the valve 63 for controlling the capacity of the water pump 10 is connected to the discharge side of the water pump 10. If the valve 61 connected to the suction side of the vacuum pump 4 is severely throttled, the amount of air discharged by the vacuum pump 4 per a unit time is decreased and the rising of the liquid level in the closed tank 1A or 1B is delayed. On the other hand, if the valve 62 connected to the suction side of the compressor 5 is severely throttled, the amount of air introduced into the closed tanks 1A and 1B by the compressor per unit of time is decreased, and the lowering of the liquid level in the closed tanks 1A and 1B is delayed. Further, if the valve 63 connected to the water pump 10 is severely throttled, both the amounts of the water sucked out of one closed tank and fed into the other closed tank by the water pump 10 are decreased and the amount of solids introduced into the closed tanks 1A and 1B per unit time is decreased.

When the air change-over valve 3 and the four-way changeover valve 9 are simultaneously changed-over by the level detector 39, if the concentration of the solids is low, the valve 63 connected to the water pump 10 is widely opened and the valves 61 and 62 connected to the compressor 5 and the vacuum pump 4 respectively are throttled. In this condition, since the capacity of the air system is small and the capacity of the water pump 10 is large, the rising of the liquid lever in the closed tanks is delayed and a large amount of water is introduced into the closed tanks over a period of time. Therefore, a large amount of the solids are introduced into the closed tanks per each suction cycle.

On the contrary, when the concentration of the solids is high, the valves 61 and 62 are opened widely and the valve 63 connected to the water pump 10 is throttled. In this condition, since the capacity of the air system is large and the liquid level rises quickly, the change-over time between the suction and discharge steps can be shortened. Further, the capacity of the water pump 10 is small and the amount of water introduced into the closed tank is small, whereby the amount of water, and consequently the amount of solids per cycle can be decreased.

When two closed tanks are provided, one closed tank in the suction step functions as a liquid source.

In the solids transfer apparatus shown in FIGS. 1 and 5, water is fed into or discharged out of the water chamber 7 by means of only a single water pump 10. However, in the solids transfer apparatus in FIG. 6, a suction pump 10S for suction use only and a discharge pump 10D for discharge use only are employed instead of the single water pump 10. In this case, the suction pump 10S is a centrifugal pump and the discharge pump 10D may be a centrifugal pump or a pump of another type.

A favorable water pump is one that can suck the water into the water chamber as quickly as possible during the suction step and also can quickly discharge all the solids out of the solids chamber together with the liquid fed into the water chamber.

Figure 7:
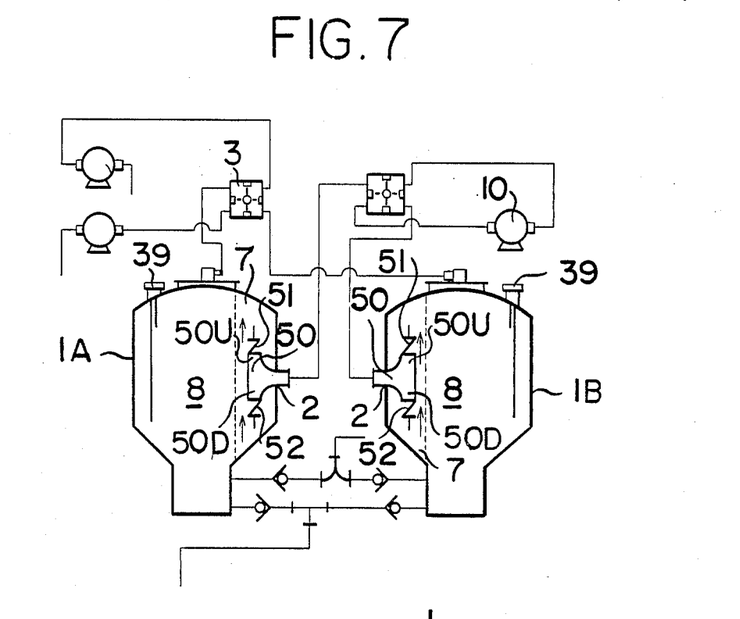
Figure 8:
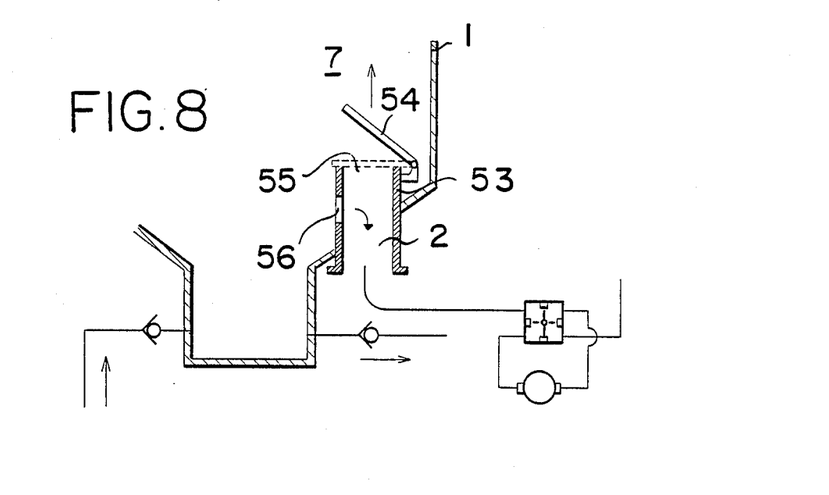
FIG. 8 is a partly enlarged sectional view of a closed tank provided with a nonreturn valve in a water inlet and outlet opening.

Examples of an apparatus having these properties are shown in FIGS. 7 and 8. In the solids transfer apparatus shown in FIG. 7, a branch member 50 having vertically elongated branch pipes 50U and 50D is connected to the water inlet and outlet opening 2, and nonreturn valves 51 and 52 are connected to the branch pipes 50U and 50D respectively. The upper branch pipe 50U with nonreturn valve 51 controls the water supply to the upper portion of the closed tank. The lower branch pipe 50D with nonreturn valve 52 controls the water discharge to the bottom of the closed tank. In the suction step, the liquid is discharged through the lower branch pipe 50D, while in the discharge step, the liquid is supplied through the upper branch pipe 50U.

In the suction step, if the lower branch pipe 50D is below the liquid level, a level indicator 39 detects this and at this stage the water pump 10 begins to discharge the liquid out of the water chamber 7.

In FIG. 8, a pipe 53 is mounted vertically in the water inlet and outlet opening 2. A nonreturn valve 54 adapted to be closed in the water discharge step is provided over a water inlet opening 55 in the upper portion of the pipe 53, and a water outlet opening 56 is provided in the lower portion of the pipe 53. The water inlet and outlet opening 2 is so concentrated that, in the suction step, the liquid inside the water chamber 7 is sucked out through the water outlet opening 56, and, in the discharge step, almost the entire amount of liquid is supplied through the water inlet opening 55.

Different from the lifting of fish out of a fish tank to a quay of a fishing port, when fish are lifted and put on board from a net in the fishing grounds, sometimes the concentration of fish is extremely low and in the worst case there are no fish and only water is lifted. In such a case, the frequent change-over operation of the two closed tanks causes a loss of time since the change-over operation includes a time during which neither suction nor discharge is performed. Further, the discharge step may start before a sufficient amount of fish is sucked into the closed tank on the suction side, whereby the efficiency of the operation is lowered.

In the case of landing fish out of a fish tank, when there is a decreased amount of water and fish, water and air mixed therewith are sucked through the suction pipe. However, in the case of lifting fish out of a net, no air is mixed with the sucked water. Therefore, the following operation may be used. 1. With the operation of the compressor 5 preliminarily stopped, only the vacuum pump 4 is operated firstly to reduce the pressure in the closed tank 1A and thereby to suck water and fish therein. With the four-way change-over valve 9 set at the position as shown in full lines in FIG. 5, the water pump 10 is operated to raise the concentration of fish in the closed tank 1A. Through the detection of the upper limit water level using the level detector 39, the operation of the vacuum pump 4 is stopped. The timer is set so that a suitable time can be selected for changing-over the four-way change-over valve and thereby a preferable concentration of fish in the closed tank is obtained.

2. Under the timer control, the air change-over valve 3 and the four-way change-over valve 9 are changed over so as to put the closed tank 1B into the suction condition and the closed tank 1A into the discharge condition. The level detector 39 allows the vacuum pump 4 to be operated and water and fish begin to be sucked into the closed tank 1B. With the four-way change over valve 9 set in the position as shown in broken lines in FIG. 5, water is transferred under pressure out of the closed tank 1B into the closed tank 1A, and water and fish inside the closed tank 1A re discharged. In this case, since the compressor 5 is not operated, fish are discharged out only by means of water in such a manner that the fish settled down in the bottom of the closed tank are firstly discharged and the remainder subsequent thereto.

3. Under the timer control, the operation is changed-over again to put the closed tank 1A into the suction condition and the closed tank 1B into the discharge condition. However, after that, in order to keep the upper limit water level in the closed tanks 1A and 1B, the water and fish suction or discharge operation is performed only by changing-over the four-way change-over valve 9 i.e. without any operation of the vacuum pump 4 as long as air is not sucked into the suction pipe 13. The vacuum pump 4 is operated for a short time only in the case some amount of air is sucked into the suction pipe 13.

The operation for lifting fish mainly through the water flow action by means of the water pump 10 without the operation of the compressor terminates in the following manner. The air inlet valve 40 provided in the suction pipe 13 is opened so as to drop the water and fish in the suction pipe 13. And at the same time, by stopping the operation of the vacuum pump 4 and starting the operation of the compressor 5, the air pressure operation for pressure transferring water and fish is applied to the closed tanks 1A and 1B. Thereby water and fish are completely discharged and then the operation is stopped. In this case, the water pump 10 need not necessarily be operated but through the operation thereof, the discharge step can be somewhat more quickly performed.

The above described operation is applied mainly in the case the length of each fish body is larger than the inner diameter of the suction pipe, where each fish body must be arranged in a direction longitudinal of the suction pipe in order to be sucked therethrough. This causes more or less resistance in the region about the suction opening of the suction pipe, and an amount of water larger than the amount of fish is sucked into the suction pipe. In other words, in the case of lifting fish out of the fish tank, the concentration of fish in the suction pipe becomes lower than that in the fish tank.

In FIG. 5 the level detector 39 is adapted to generate, at the upper limit, a signal for stopping the operation of the vacuum pump 4, and, at the lower limit, one for stopping the operation of the compressor 5. The lower limit electrode rod is located at a position slightly higher than the level of the water inlet and outlet opening 2 so that air is not sucked into the water pump 10 when the fish transfer is completed and a new water suction step is started.

In the case of lifting fish out of a net at a fishing ground, it is preferable that the two closed tanks 1A and 1B always be almost full of water, and the operation of the compressor is stopped in the discharge step (consequently, it is unnecessary to discharge air from the closed tanks by means of the vacuum pump 4), the compressor 5 being operated only for completely discharging water and fish out of the closed tanks in the last stage. This is because, since the two closed tanks are separated located, e.g. on opposite sides of a ship, if the compressor 5 is operated for discharging water and fish out of the closed tanks the center of the gravity moves in the lateral direction of the ship, thereby causing the ship to heel or roll.

If the solids transfer apparatus according to the present invention is provided with a water pump which is used as both a pressure reduction means and a supply means, a vacuum pump and a compressor are not required and can be done without e.g. by using a self-suction pump as the water pump. Further, if the apparatus is provided with a vacuum pump and a compressor, a water pump for discharging water out of the closed tank and supplying water thereinto is not required.

However, as shown in FIG. 5, in a solids transfer apparatus provided with the vacuum pump 4 and the compressor 5, it is possible that the water pump 10 can be continuously operated, the four-way change-over valve 9 and the air change-over valve 3 being subject to the change-over operation under the timer control for putting the closed tank 1A in the suction condition and the closed tank 1B in the discharge condition, and then the reverse, and repeating these operations, water and fish thereby being transferred under pressure to the separator 38.

FIG. 5 shows an example in which fish are drawn out of the fish tank 41. Fish are separated from the water in the separator 38 and discharged, while water is recycled into the fish tank 41.

The closed tank has the shape of a tube, and therefore when water is injected under pressure into the closed tank it is more difficult to transfer fish near the tank wall and especially near the bottom of the tank than fish positioned in the center of the tank. Consequently, in order to inject a large amount of water especially toward the tank wall ad the tank bottom, a deflecting vane 42 is provided in the tank.

Further, since the injected pressurized water has high kinetic energy and stirs fish in the closed tank, the vane also functions as a plate-shaped resisting member for making substantially uniform the section of the tube-shaped closed tank and for raising the speed of the water flow about the tank wall and the tank bottom somewhat as abovementioned.

A vacuum switch 43 is provided on the suction side of the water pump 10 in order to detect the concentration of fish in the closed tank in the suction operation. If the concentration of fish in the closed tank becomes high, it becomes difficult to suck the water and therefore the vacuum becomes high. At a predetermined high degree of vacuum, the vacuum switch is actuated for detecting the high concentration of fish and generates a signal. This signal way be used as a signal for changingover the four-way change-over valve 9.

As shown in FIG. 5 a water discharge valve 37 is provided on the discharge side of the water pump 10. This water discharge valve 37 is used for discharging water from the fish tank 41 as the amount of fish in the fish tank 41 decreases. Since the concentration of fish in the fish tank 41 becomes low as fish are transferred, excess water is discharged from the fish tank 41 by opening the water discharge valve 37.

A solids transfer apparatus according to the present invention may be provided with a removing means for preventing the nonreturn valve 12 on the suction side from catching solids therein when it is closed. An example of such a removing means is shown in FIG. 9. The removing means shown in FIG. 9 comprises the water pump 10 functioning as a water supply means and a solids removing valve 64. The discharge side of the water pump 10 is connected through the solids removing valve 64 to the suction side of the nonreturn valve 12 i.e. a suction distributing junction 65 to which the suction pipe 13 is connected.

The solids removing valve 64 comprises a four-way valve one outlet of which is closed and which is adapted to pass the liquid discharged from the water pump 10 to the four-way change-over valve 9 or the suction junction 65.

If a four-way change-over valve having such a construction e.g. as shown in FIGS. 3 or 4 is used as the solids removing valve 64, the discharge side of the water pump 10 is prevented from being blocked at the change-over time and thus the water pump is not subjected to any shock. The solids removing valve 64 prevents the nonreturn valve 12 from having solids caught therein when it is closed. The solids removing valve 64 is operated in the following manner. When enough solids are sucked into the closed tank in the suction step (at this stage, no solids remain in the closed tank on the discharge side) and the level detector generates a signal for changing-over the four-way changeover valve 9, the solids removing valve 64 is changed-over before the changing-over of the four-way change-over valve 9. Thereby the discharge side of the water pump 10 is communicated only with the suction junction 65, and the water sucked out of the closed tank in the suction step is recycled through the nonreturn valve 12 into the closed tank in the suction step. In this case, since the closed tank in the suction step is being supplied with water (the nonreturn valve 12 on the suction side of the closed tank in the discharge condition being closed), the pressure in the closed tank in the suction condition is not reduced and the liquid passing through the suction pipe 13 stops. Further, no water is fed into the closed tank in the discharge condition. The solids in the nonreturn valve 12 in the suction action are removed from the nonreturn valve 12 by means of the water flow circulating only in the closed tank in the suction step and then are introduced into the closed tank. One or two seconds after that, the solids removing valve 64 is changed-over so that the discharge side of the water pump 10 comes into communication with the four-way change-over valve, and at the same time the four-way change-over valve 9 is changed-over.

When the solids removing valve 64 is in such a position as to communicate the discharge side of the water pump 10 with the suction junction 65, the liquid in the closed tank in the suction condition is recycled through the closed tank, the water pump 10, the suction juction 65 and the nonreturn valve 12. If the operation of the vacuum pump 4 is stopped in this condition, no solids are sucked through the suction pipe 13 and there are no solids in the nonreturn valve 12. Further, if the vacuum pump 4 is operated in this condition, only the same amount of liquid as the amount of air discharged by the vacuum pump 4 from the closed tank is sucked through the suction pipe 13. The liquid sucked through the suction pipe 13 and a large amount of water recycled by the water pump 10 is passed through the nonreturn valve 12. Further, the discharge of the water pump 10 is several times the amount of the water sucked through the suction pipe by the vacuum pump 4. Therefore, the concentration of the solids in the liquid passing through the nonreturn valve 12 is reduced, and as a result, no solids are caught in the nonreturn valve 12 when it is closed. The nonreturn valve on the discharge side catches hardly any solids. This is because, when the length of each of the solids is larger than the inner diameter of the suction pipe 13, more solids are discharged from the closed tank than are sucked up through the suction pipe from a solids tank. In other words, when the solids are sucked through the suction pipe 13, they are generally sucked upwardly from e.g. a fish tank. Therefore, there is a strong resistance near the suction opening of the suction pipe 13 against the solids to be sucked, and the concentration of fish in the suction pipe 13 is much lower than that in the fish tank. For example, if fish each 40 cm long are sucked through a hose whose inner diameter is 200 mm$\phi$, the thickest mixture passing through the hose consists of 20% of fish and 80% of water. On the other hand, fish are easily discharged from the closed tank because the discharge opening is provided at the bottom of the closed tank where fish are apt to be settled. Thus, the concentration of fish is about 90 to 80% in the mixture discharged from the closed tank through a hose of 200 mm$\phi$ inner diameter. Water discharged from one closed tank is introduced into the other closed tank. Therefore, the discharge of fish from one closed tank is performed before the introduction of fish into the other closed tank. Namely, fish have been completely discharged out of the closed tank in the discharge condition before fish are filled into the closed tank in the suction condition. Consequently, no fish are caught in the nonreturn valve 15 when the four-way change-over valve is changed-over.

As above described, if the water pump used for sucking water out of the closed tank also fuctions as a water supply means for the solids removing means, another pump for use as such a water supply means is not required and the construction of the solids transfer apparatus can be simplified.

The water supply means used for supplying liquid through the solids removing valve into the suction valve, is not limited to a water pump but may be any means which can supply liquid to the suction side of the suction valve, e.g. a water tank.

Figure 10:
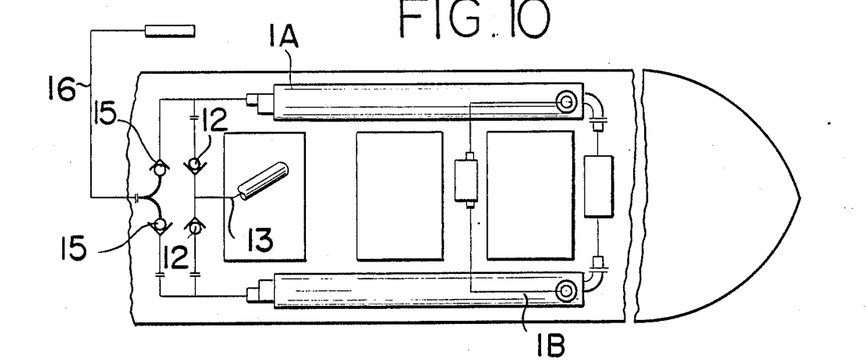
FIG. 10 is a schematic plan view and FIG. 11 is a sectional view showing examples of a solids transfer apparatus in which closed tanks are mounted on a boat.
Figure 11:
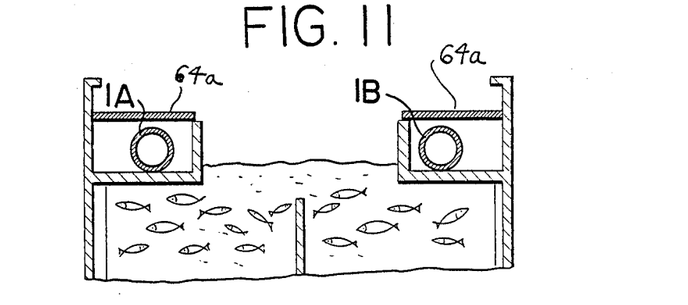

FIGS. 10 and 11 show an arrangement in which the solids transfer apparatus is mounted on a fishing boat. Two closed tanks 1A and 1B are disposed separately on the left and right sides of the boat, respectively, and or elongated in the direction of the length of the boat. If the closed tanks 1A and 1B are fixed in this manner, the boat has a stability in the lateral direction. Further, by disposing the closed tanks below the boards 64a on the deck, no trouble is caused to other operations. The suction and discharge opening in the lowrr portion of the closed tank is located toward the stern, with the air inlet and outlet opening toward the stern. This is because the body of a fishing boat, either loaded or unloaded, is generally somewhat inclined in such a manner that the deck slopes upward toward the stern. Therefore, with the above described arrangement of the suction and discharge opening and the air inlet and outlet opening, and further because after the closed tank is filled with water in the air discharge step using the vacuum pump, through the upper limit detection by means of the level detector or the rising of a float valve, the air inlet and outlet valve must be closed.

The water pump, the four-way change-over valve, the vacuum pump, the nonreturn valve and other parts are located below the deck between two hatches as shown in FIGS. 10 and 11. With such an arrangement, no trouble is caused to other operations.

The air inlet opening and the air outlet opening can be combined into an air inlet and outlet opening. Similarly, the suction opening and the discharge opening can be combined into a suction and discharge opening, and the water inlet opening and the water outlet opening into a water inlet and outlet opening.

The present invention thus provides a solids transfer apparatus comprising a closed tank provided with an air outlet opening, a porous plate through which water can pass but solids cannot pass stretched across the closed tank so as to divide the inside of the closed tank into a water chamber and a solids chamber, a water pump connected to the water chamber in the closed tank so that liquid can be sucked out of the water chamber by the water pump, a water flow line provided so as to feed water into the water chamber or the solids chamber, and in the lower portion of the closed tank there being a suction opening and a discharge opening through which water mixed with solids can be introduced or discharged.

If the suction opening and a discharge opening are separately provided for feeding water into the water chamber or discharging water therefrom the discharge opening is preferably provided in the lower portion of the closed tank, but the suction opening is not necessarily located in the lower portion thereof and may be provided in the upper portion of the closed tank. Further, water mixed with solids must be discharged through a discharge opening provided exclusively in the lower portion of the closed tank. On the other hand, the suction opening for introducing the mixture into the closed tank may be located in any portion of the solids chamber, which is apparent from the operation of the suction opening.

The air change-over valve may be a conventional four-way change-over valve in which all the ports are closed at the middle change-over position, but it may comprise one having same construction as the four-way change-over valve 9 shown in FIGS. 3 and 4.

Figure 12:
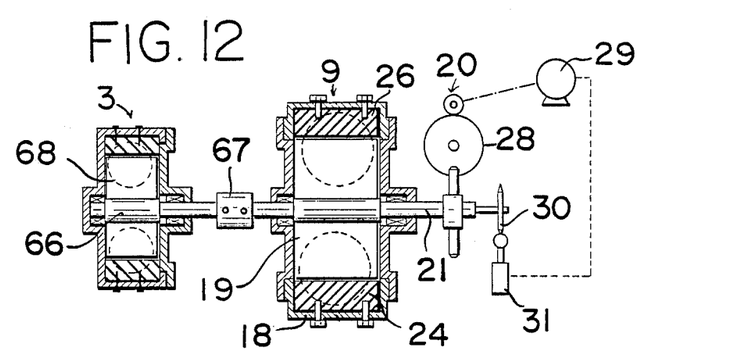
FIG. 12 is a sectional view of an air change-over valve and a four-way change-over valve interlocked with each other.

When the air change-over valve 3 comprises a four-way change-over valve having the same construction as the four-way change-over valve 9 in which the closing element 19 is fixed to the shaft 21 as shown in FIGS. 3 and 4, a shaft 66 of the air change-over valve 3 and the shaft 21 of the four-way change-over valve 9 can be connected with each other through a coupling 67 so that the two valves can be interlocked with each other as shown in FIG. 12.

With such an arrangement, the change-over mechanism of the two valves 3 and 9 can be greatly simplified because the two valves are generally changed-over simultaneously.

In the solids transfer apparatus shown in FIG. 5, 6, 7 and 9, with the water flow transfer function of the water pump being stopped if necessary, solids can be transferred only by using the pneumatic transfer function of the vacuum pump and the compressor. Further, with the operation of the compressor being stopped, solids can be efficiently transferred by using the water flow obtained by the water pump and by concentrating the thin mixture of liquid and solids. Furthermore, depending upon the state of the solids, the shape and position of the closed tank, the most adequate transfer method can be obtained by selecting the ratio of the pneumatic transfer power and the water flow transfer power, i.e. the capacities of the pneumatic apparatus and the water pump, and the operation times thereof.

The pneumatic transfer method comprises giving pressure energy to air by means of the vacuum pump and the compressor and transferring the mixture of liquids and solids in the closed tank by using the pressure energy of air. The energy transmission here is performed indirectly i.e. through air the volume of which is easily changed. Therefore, the pneumatic transfer operation is disadvantageous in that the amount of transferred mixture of liquids and solids is small considering the supplied energy, i.e. the energy efficiency being bad. On the contrary, since the water flow transfer method comprises sucking and transferring under pressure the water in the closed tank directly by means of the water pump, the energy efficiency is so excellent that it is about 5 to 7 times that of the pneumatic transfer method. Further, the necessary motor input in the case of the water flow transfer method is only 1/5 to 1/7 of that of the pneumatic transfer method.

As above described, the solids transfer apparatus according to the present invention is a static volume type transfer apparatus in which solids and liquid are sucked into the closed tank through the reduction of the pressure inside the closed tank by means of a pressure reduction means, and then air or liquid is supplied into the closed tank by the supply means so that solids are discharged together with air or liquid from the closed tank, whereby solids are transferred. In this apparatus, since solids are not passed through an impeller of a pump, they can be transferred without being damaged. Besides, this apparatus is advantageous in that since a solids removing means is provided so that solids are prevented from being caught in the suction valve, solids can be transferred without being damaged.

Furthermore, n the solids transfer apparatus according to the present invention by supplying liquid to the suction side of the suction valve before the valve is opened, i.e. without changing the construction of the suction valve and without the need of any complicated operation, solids can be prevented from being caught in the suction valve. Therefore, advantageously, the whole construction and the operation of the apparatus can be greatly simplified.

What is claimed is:

1. An apparatus for transferring relatively large solid items such as fish, hams or sausages by the use of liquid as a transfer medium, said apparatus comprising:
   first and second closed tanks;
   each said tank having extending across the interior thereof a porous plate dividing said interior into a liquid chamber and a solids chamber;
   each said tank having suction opening means, opened by a suction valve means when said interior of said tank is subjected to vacuum, for introducing solids and liquid into the respective said solids chamber, such solids being retained in said solids chamber and such liquid passing through the respective said porous plate to the respective said liquid chamber;
   each said tank having a discharge opening means, opened by a discharge valve means when said interior of said tank is pressurized, for discharging solids and liquid from the respective said solids tank;
   each said tank having therein means for selectively withdrawing liquid from the respective liquid chamber thereof and for injecting liquid into said interior thereof;
   liquid pump means for pumping liquid into said liquid chamber of one said tank while withdrawing liquid from said liquid chamber of the other said tank;
   liquid change-over valve means, having first and second operating arrangements and operably connected to said liquid pump means and to said withdrawing and injecting means of both said tanks, for, upon said valve means being in said first operating arrangement, causing said liquid pump means to withdraw liquid from said withdrawing means of said first tank, thereby reducing the pressure in said interior of said first tank and introducing solids and liquid through the respective said suction opening means into the respective said solids chamber, and causing said liquid pump means to pump liquid through said injecting means of said second tank and inject said liquid into the respective said interior, thereby washing away solids in the respective said solids chamber and discharging said solids and liquid through the respective said discharge opening means, and for, upon said valve means being in said second operating arrangement thereof, reversing such connections between said pump means and said first and second tanks; and
   each of said withdrawing and injecting means comprising a branch member connected to said change-over valve means and extending through the respective said tank into the respective said liquid chamber, said branch member having extending therefrom upwardly and downwardly directed branch pipes, said upwardly directed branch pipe having a non-return valve enabling liquid to be injected into said liquid chamber and preventing liquid movement in the reverse direction, and side downwardly directed branch pipe having a non-return valve enabling liquid to be withdrawn from said liquid chamber and preventing liquid movement in the reverse direction.

2. An apparatus as claimed in claim 1, wherein said liquid pump means comprises a single volute pump.

3. An apparatus as claimed in claim 2, wherein said single pump comprises a turbine pump.

4. An apparatus as claimed in claim 1, wherein said liquid pump means comprises a first volute pump having an intake side connected to said change-over valve means, and a second volute pump having a discharge side connected to said change-over valve means, and further comprising a liquid supply source connected to the discharge side of said first volute pump and to the intake side of said second volute pump.

5. An apparatus as claimed in claim 1, wherein each said porous plate extends vertically in the respective said tank.

6. An apparatus as claimed in claim 5, further comprising a deflector vane positioned within each said liquid chamber at a position facing the respective said withdrawing and injecting means.

7. An apparatus as claimed in claim 1, further comprising air suction pump means for selectively withdrawing air from and reducing the pressure in the interiors of said tanks and thereby for facilitating the introduction of solids and liquid into the solids chambers thereof, and air change-over valve means for selectively connecting the suction side of said air suction pump means to the interior of the said tank from which liquid is withdrawn by said liquid pump means, said air suction pump means having a discharge side permanently connected to atmospheric pressue.

8. An apparatus as claimed in claim 7, further comprising air compressor means for selectively supplying air into and increasing the pressure in the interiors of said tanks and thereby chambers thereof, and said air change-over valve means being connected for selectively connecting the discharge side of said air compressor means to the interior of said tank into which is injected said liquid by said liquid pump means, said air compressor means having an intake side permanently connected to atmospheric pressure.

9. A solids transfer apparatus comprising:

two closed tanks, each tank having a porous plate across the interior for dividing the inside of the respective tank into a water chamber and a solids chamber, said tanks each having a discharge opening means for discharging solids and water in the bottom of the solids chamber, and an air opening for sucking out air therefrom;

a discharge valve in each said discharge opening means for being opened when the closed tank is under pressure for having liquid and solids therein discharged therefrom;

said tanks each having a suction opening means for introducing solids and liquid into the solids chamber;

a suction valve means in each suction opening means for being opened when the tank is under a vacuum for having liquids and solids sucked thereinto;

a vacuum pump, the suction side of which is alternately communicated with said air opening for drawing air from one or the other of said closed tanks for reducing the pressure therein for causing liquid and solids to be sucked into the closed tank, and the discharge side of which is open to atmospheric air;

a liquid pump means;

change-over valve means changeable to at least two positions and connected between the respective tanks and said pump means for, when said change-over valve means is in one position, connecting the water chamber of one tank to the intake side of said pump means for reducing the pressure in said one tank for causing solids and liquid to be sucked into the one tank and connecting the discharge side of said pump means to the other tank for supplying liquid to the other tank for causing solids and liquid to be discharged from the other tank, and for reversing the connections when changed to the second position; and a removing means constituted by a solids removing valve connected between the discharge side of said liquid pump means and the suction side of said suction valve means for circulating all the liquid being pumped by said liquid pump means through the suction valve means, the porous plate in the closed tank and change-over valve means before the suction valve means is closed at the end of a suction operation for drawing liquid and solids into said tank for clearing any solids from said suction valve means.

10. A solids tansfer apparatus as claimed in claim 9, in which said tank has a liquid inlet and outlet opening at the bottom of said water chamber, said opening being connected to said change-over valve.

11. A solids transfer apparatus as claimed in claim 9, in which said suction opening means and said discharge opening means is comprised of a single opening in the bottom of said tank.

12. An apparatus for transferring relatively large solid items such as fish, hams or sausages by the use of liquid as a transfer medium, said apparatus comprising:
first and second closed tanks;
each said tank having extending across the interior thereof a porous plate dividing said interior into a liquid chamber and a solids chamber;
each said tank having suction opening means, opened by a suction valve means when said interior of said tank is subjected to vacuum, for introducing solids and liquid into the respective said solids chamber, such solids being retained in said solids chamber and such liquid passing through the respective said porous plate to the respective said liquid chamber;
each said tank having a discharge opening means, opened by a discharge valve means when said interior of said tank is pressurized, for discharging solids and liquid from the respective said solids tank;
each said tank having therein means for selectively withdrawing liquid from the respective liquid chamber thereof and for injecting liquid into said interior thereof;
liquid pump means for pumping liquid into said liquid chamber of one said tank withdrawing liquid from said liquid chamber of the other said tank;
liquid change-over valve means, having first and second operating arrangements and operably connected to said liquid pump means and to said withdrawing and injecting means of both said tanks, for, upon said valve means being in said first operating arrangement, causing said liquid pump means to withdraw liquid from said withdrawing means of said first tank, thereby reducing the pressure in said interior of said first tank and introducing solids and liquid through the respective said suction opening means into the respective said solids chamber, and causing said liquid pump means to pump liquid through said injecting means of said second tank and inject said liquid into the respective said interior, thereby washing away solids in the respective said solids chamber and discharging said solids and liquid through the respective said discharge opening means, and for, upon said valve means being in said second operating arrangement thereof, reversing such connections between said pump means and said first and second tanks; and
each said withdrawing and injecting means comprising a pipe connected to said change-over valve and extending vertically through the respective said tank into the respective said liquid chamber, the inner end of said pipe having a nonreturn valve enabling liquid to be injected into said liquid chamber and preventing liquid movement in the reverse direction, and a liquid outlet opening in said pipe at a position below said inner end thereof and enabling liquid to be withdrawn from said liquid chamber.

13. An apparatus as claimed in claim 12, wherein said liquid pump means comprises a single volute pump.

14. An apparatus as claimed in claim 13, wherein said single pump comprises a turbine pump.

15. An apparatus as claimed in claim 12, wherein said liquid pump means comprises a first volute pump having an intake side connected to said change-over valve means, and a second volute pump having a discharge side connected to said change-over valve means, and further comprising a liquid supply source connected to the discharge side of said first volute pump and to the intake side of said second volute pump.

16. An apparatus as claimed in claim 12, wherein each said porous plate extends vertically in the respective said tank.

17. An apparatus as claimed in claim 16, further comprising a deflector vane positioned within each said liquid chamber at a position facing the respective said withdrawing and injecting means.

18. An apparatus as claimed in claim 12, further comprising air suction pump means for selectively withdrawing air from and reducing the pressure in the interiors of said tanks and thereby for facilitating the introduction of solids and liquid into the solids chambers thereof, and air change-over valve means for selecitvely connecting the suction side of said air suction pump means to the interior of the said tank from which liquid is withdrawn by said liquid pump means, said air suction pump means having a discharge side permanently connected to atmospheric pressure.

19. An apparatus as claimed in claim 18, further comprising air compressor means for selectively supplying air into and increasing the pressure in the interiors of said tanks and thereby for facilitating the discharge of solids and liquid from the solids chambers thereof, and said air change-over valve means being connected for selectively connecting the discharge side of said air compressor means to the interior of said tank into which is injected said liquid by said pump means, said air compressor means having an intake side permanently connected to atmospheric pressure.

20. An apparatus for transferring relatively large solid items such as fish, hams or sausages by the use of liquid as a transfer medium, said apparatus comprising:
first and second closed tanks;
each said tank having extending across the interior thereof a porous plate dividing said interior into a liquid chamber and a solids chamber;
each said tank having suction opening means, opened by a suction valve means when said interior of said tank is subjected to vacuum, for introducing solids and liquid into the respective said solids chamber, said solids being retained in said solids chamber and such liquid passing through the respective said porous plate to the respective said liquid chamber;
Each said tank having a discharge opening means, opened by a discharge valve means when said interior of said tank is pressurized, for discharging solids and liquid from the respective said solids tank;
each said tank having therein means for selectively withdrawing liquid from the respective liquid chamber thereof and for injecting liquid into said interior thereof;
liquid pump means for pumping liquid into said liquid chamber of one said tank while withdrawing liquid from said liquid chamber of the other and tank;
liquid change-over valve means, having first and second operating arrangements and operably connected to said liquid pump means and to said withdrawing and injecting means of both said tanks, for, upon said valve means being in said first operating arrangement, causing said liquid pump means to withdraw liquid from said withdrawing means of said first tank, thereby reducing the pressure in said interior of said first tank and introducing solids and liquid through the respective said suction opening means into the respective said solids chamber, and causing said liquid pump means to pump liquid through said injecting means of said second tank and inject said liquid into the respective said interior, thereby washing away solids in the respective said solids chamber and discharging said solids and liquid through the respective said discharge means, and for, upon said valve means being in said second operating arrangement thereof, reversing such connections between said pump means and said first and second tanks; and
removing means for, upon the completion of introduction of solids and liquid through the respective said suction opening means and into the respective said solids chamber of one of said tanks, clearing any solids within the respective said suction valve means before changing-over said liquid change-over valve means and closing said respective suction valve means, said removing means comprising solids removing valve means connected to the discharge side of said liquid pump means for interrupting the injection of said liquid into the other of said tanks and temporarily injecting all of said liquid into the suction side of said respective suction valve means, thereby temporarily circulating all of said liquid through said one tank.

21. An apparatus as claimed in claim 20, wherein said liquid pump means comprises a single volute pump.

22. An apparatus as claimed in claim 21, wherein said single pump comprises a turbine pump.

23. An apparatus as claimed in claim 20, wherein said liquid pump means comprises a first volute pump having an intake side connected to said change-over valve means, and a second volute pump having a discharge side connected to said change-over valve means, and further comprising a liquid supply source connected to the discharge side of said first volute pump and to the intake side of said second volute pump.

24. An apparatus as claimed in claim 20, wherein each said porous plate extends vertically in the respective said tank.

25. An apparatus as claimed in claim 24, further comprising a deflector vane positioned within each said liquid chamber at a position facing the respective said withdrawing and injecting means.

26. An apparatus as claimed in claim 20, further comprising air suction pump means for selectively withdrawing air from and reducing the pressure in the interiors of said tanks and thereby for facilitating the introduction of solids and liquid into the solids chambers thereof, and air change-over valve means for selectively connecting the suction side of said air suction pump means to the interior of the said tank from which liquid is withdrawn by said liquid pump means, said air suction pump means having a discharge side permanently connected to atmospheric pressure.

27. An apparatus as claimed in claim 26, further comprising air compressor means for selectively supplying air into and increasing the pressure in the interiors of said tanks and thereby for facilitating the discharge of solids and liquid from the solids chambers thereof, and said air change-over valve means being connected for selectively connecting the discharge side of said air compressor means to the interior of said tank into which is injectd said liquid by said liquid pump means, said air compressor means having an intake side permanently connected to atmospheric pressure.

* * * * *